US007698746B2

(12) United States Patent
Richards, Jr. et al.

(10) Patent No.: US 7,698,746 B2
(45) **Date of Patent: *Apr. 13, 2010**

(54) METHOD FOR PROVIDING SECURE ACCESS TO INFORMATION HELD IN A SHARED REPOSITORY

(75) Inventors: Patrick James Richards, Jr., Marietta, GA (US); Matthew Bunkley Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 439 days.

This patent is subject to a terminal disclaimer.

(21) Appl. No.: 11/528,228

(22) Filed: Sep. 26, 2006

(65) Prior Publication Data

US 2007/0022302 A1 Jan. 25, 2007

Related U.S. Application Data

(60) Continuation of application No. 11/358,812, filed on Feb. 21, 2006, now Pat. No. 7,203,839, which is a division of application No. 10/082,693, filed on Feb. 22, 2002, now Pat. No. 7,062,656.

(51) Int. Cl.

*G06F 7/04* (2006.01)
*G06F 17/30* (2006.01)
*H04N 7/16* (2006.01)

(52) U.S. Cl. .......................... 726/28; 713/165; 713/185

(58) Field of Classification Search ................. 713/185, 713/165; 726/28

See application file for complete search history.

(56) References Cited

U.S. PATENT DOCUMENTS 5,732,229 A 3/1998 Dickinson ................... 395/334
5,915,001 A 6/1999 Uppaluru ................. 379/88.22
6,055,512 A 4/2000 Dean et al. ..................... 705/17
6,157,954 A 12/2000 Moon et al. ................. 709/228
6,175,741 B1 1/2001 Alperovich ................. 455/458
6,205,478 B1 3/2001 Sugano et al. .............. 709/223
6,269,369 B1 7/2001 Robertson ..................... 707/10
7,305,556 B2 * 12/2007 Slick et al. .................. 713/169
2001/0020228 A1 * 9/2001 Cantu et al. ..................... 705/1
2001/0027472 A1 10/2001 Guan ......................... 709/203

FOREIGN PATENT DOCUMENTS

WO WO0159595 8/2001

* cited by examiner

*Primary Examiner*—Emmanuel L Moise
*Assistant Examiner*—Michael Pyzocha
(74) *Attorney, Agent, or Firm*—John Pivnichny

(57) ABSTRACT

A method for providing secure access to information held in a shared repository, for example to electronic business cards stored on a server. A data owner registers with the server and provides information to be shared with selected data users. The server returns public-key cryptography keys. To access the information, a data user sends its public key to the data owner. The data owner encrypts the public key using the data owner private key, and sends the result to the server, along with permission to transfer information to the data user. The server decrypts the received result using the data owner public key, and compares the outcome with the data user public key. If they match, the server records permission on an access list. In response to a request for information the server checks the access list to determine whether the data user has permission. If so, the server encrypts the information using the data user public key, and transfers the result to the data user.

4 Claims, 6 Drawing Sheets

METHOD FOR PROVIDING SECURE ACCESS TO INFORMATION HELD IN A SHARED REPOSITORY

This is a continuation of application Ser. No. 11/358,812 filed Feb. 21, 2006, now U.S. Pat. No. 7,203,839 which is a divisional of application Ser. No. 10/082,693 filed Feb. 22, 2002 now U.S. Pat. No. 7,062,656.

FIELD OF THE INVENTION

The present invention concerns information held in a shared repository, and more particularly concerns a method for providing secure access to information such as electronic business cards that are held in a shared repository such as a data server of an electronic business card system.

BACKGROUND

Electronic data processing provides the capability to gather, store, analyze, and use vast amounts of data with convenience. For example, electronic business cards have become an accepted and convenient way of gathering and exchanging information such as postal addresses, e-mail addresses, telephone numbers, business qualifications and interests, and so forth. A good discussion of electronic business cards may be found in U.S. Pat. No. 5,732,229, “Method and apparatus for displaying business cards,” to Dickinson.

Parties may exchange business cards directly, for example as described in U.S. Pat. No. 6,175,741 “System and method for enhancing business card services within a cellular network,” to Alperovich. Unfortunately, such a direct-exchange system has a number of disadvantages. One disadvantage is the need to update the business cards sent out earlier, one by one, when information such as an address or a telephone number changes. Such updates may result in a storm of electronic messages, one sent to each recipient of the business card that needs the update. This is especially disadvantageous in a wireless communication system, wherein a user may incur an expense for each message sent or received. Moreover, there is no guarantee that the updates will reach their intended recipients, as the some of the recipients’ electronic addresses may have become obsolete.

As a result of these shortcomings, electronic business card systems have been proposed. Someone who desires to use an electronic business card system registers with the system, and sends an electronic business card to a data server that functions as a shared repository for holding electronic business cards submitted by other users. To exchange electronic business cards, the owner of the business card may grant permission to the data server to transfer the business card to selected users of the system in response to requests, and by default to withhold permission to transfer the business card to other users who may be registered with the system but unknown to the owner of the business card. The owner of the business card may, at any time, grant or revoke permission to access the business card, or change its information, by interacting with the data server. This flexibility provides a convenient way to assure that the group of users permitted to access the card and the information carried by the card remain up-to-date.

Unless the mechanism for accessing and changing electronic business cards is controlled and secure, however, registration with an electronic business card system may be akin to leaving a pile of paper business cards about, to be picked up at random by anyone who passes by. Sometimes, the uncontrolled distribution of business cards, either electronic or paper, is desirable, and serves as a form of advertising. In other circumstances, however, allowing open access to an electronic business card may subject its owner to risk. In particular, allowing an unscrupulous person to gain access to an electronic business card may subject the owner of the business card to a barrage of unwanted messages such as advertisements, scams, smut, denial of service attacks, and so on.

Moreover, as electronic business card systems become more widely used, the information carried by electronic business cards becomes more sensitive, and the incentive therefore increases for the unscrupulous to access and misuse the information. For example, an electronic business card may contain credit card or unlisted telephone numbers, account information concerning suppliers or customers, and so forth. Thus there is a need for a method that provides secure access to information held in a shared repository, such as electronic business cards held by a data server of an electronic business card system.

SUMMARY

The present invention provides secure access to information held in a shared repository, for example secure access to electronic business cards stored on a data server of an electronic business card system.

A data owner, for example the owner of a business card, registers with the data server, and provides to the data server information to be shared with selected data users under carefully controlled access. The information may be, for example, an electronic business card. The data server returns a pair of keys, public and private, of a public-key cryptography system to the data owner, and records the data owner public key for its own use as well. Data users with potential interest in receiving the information likewise register with the data server, and each data user receives its own pair of keys.

To gain permission to access the information, a particular data user sends its data user public key to the data owner. The data owner encrypts the data user public key using the data owner private key, and sends the result to the data server, along with a command tentatively giving the data server permission to transfer the information to the data user. The data server decrypts the received result using the data owner public key, and compares the outcome with the data user public key. If the comparison returns a match, the data server records, on an access list, permission to transfer the information to the data user. Optionally, a sequence number known to both the data owner and the data server may be combined with the data user public key before the data user public key is encrypted. Also, the data owner may send the data owner public key to the data user.

In one embodiment of the invention, the data user initiates transfer of the information from the data server by sending a request to the data server. The data server checks the access list, to determine whether the data server has permission to transfer the information to the data user. If the data server has permission, the data server encrypts the information using the data user public key, and transfers the encrypted information to the data user.

In another embodiment of the invention, wherein the data owner has sent the data owner public key to the data user, the data user initiates a transfer of the information from the data server by encrypting the data owner public key using the data user private key, and sends the result to the data server along with a request to transfer the information. The data server decrypts the result using the data user public key, to provide a check word. The data server compares the check word with the data owner public key. If the comparison returns a match, the data server checks the access list to determine whether the data server has permission to transfer the information to the data user. If the data server has permission, the data server transfers the information to the data user.

Thus the present invention provides secure access to information, such as electronic business cards, that is held in a shared repository, such as the data server of an electronic business card system. These and other aspects of the invention will be more fully appreciated when considered in the light of the following detailed description and drawings.

DETAILED DESCRIPTION

The present invention provides secure access to information held in a shared repository, for example secure access to electronic business cards stored on a data server of an electronic business card system. In the interest of clarity, the description that follows uses language suitable to the environment of an electronic business card system. The present invention is not limited to electronic business card systems, however, and applies as well to all environments wherein information is held in a shared repository.

Figure 1:
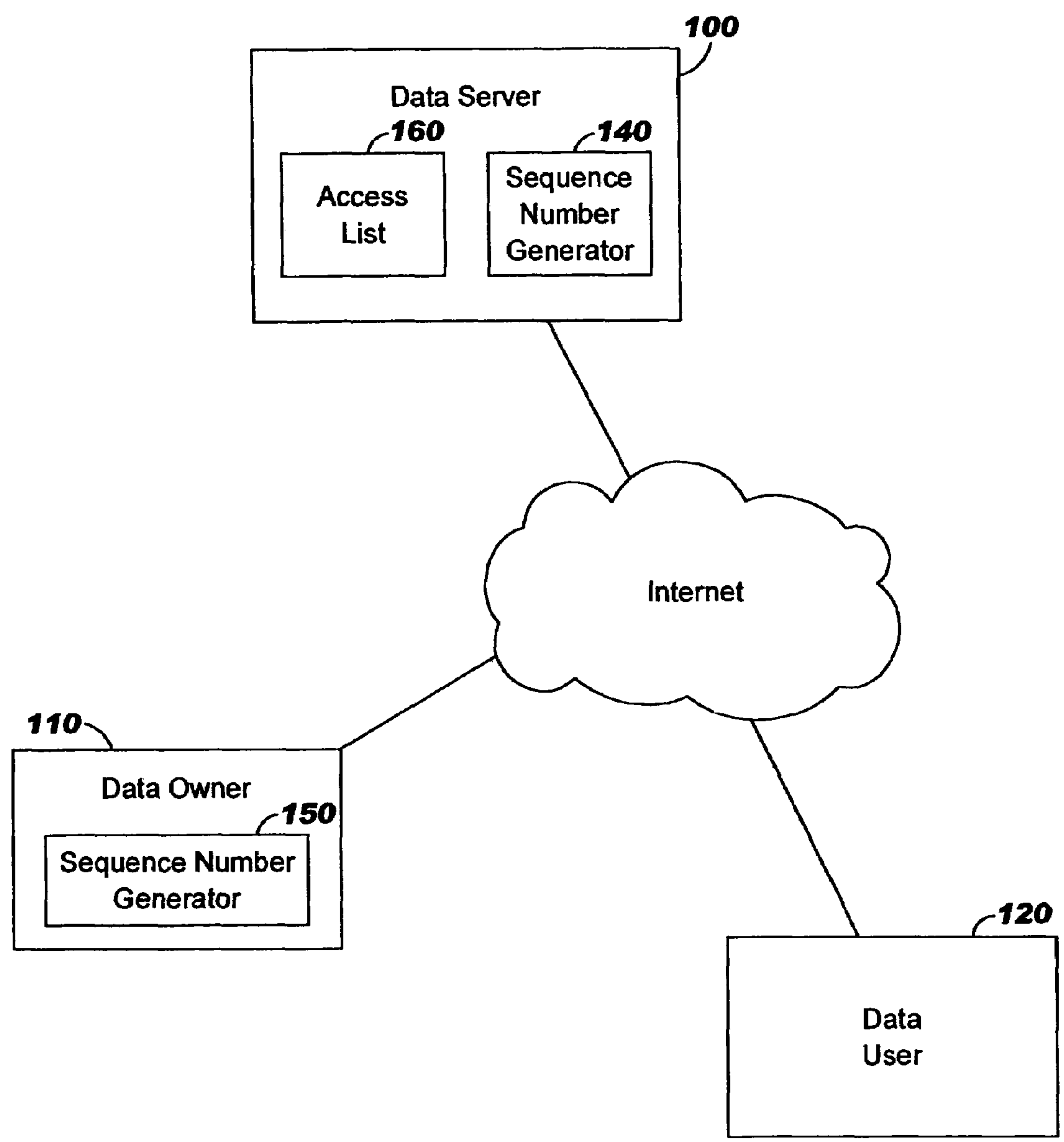
FIG. 1 is a block diagram that shows a data server, a data owner, and a data user, interconnected.

FIG. 1 is a block diagram that shows a data server 100, a data owner 110, and a data user 120. The data server 100 exemplifies a shared repository for data, and may be a server such as a data server of an electronic business card system, or may be any other kind of repository that holds data to be shared by a number of users. In the context of FIG. 1, the data server holds information provided by the data owner 110, such as an electronic business card. This information may be shared, e.g., accessed, by the data owner 110, the data user 120, and by other data users (not shown).

The data owner 110 owns the information provided to the data server 100. Here, the attribute "ownership" is meant in a general sense, and is used to indicate that the information pertains, for example, to a person or business entity associated with the data owner 110. For example, the information may include a postal address, e-mail address, telephone number, FAX number, credit card number, billing-account number, customer number, and so forth. The data owner 110 may be a client to the data server 100, for example a client program executed by a personal computer for participating in an electronic business card system.

The data user 120 uses the information, or a part of the information, provided to the data server 100 by the data owner 110. The data user 120 may be a client of the data server 100, for example a client program executed by a personal computer for participating in an electronic business card system.

In practice, the data owner 110 and the data user 120 may be identical or similar. The distinction made in FIG. 1 is that of function or role rather than necessarily a difference of structure. For example, the data owner 110 and the data user 120 may be identical client programs of an electronic businesses card system, where, in this description, the data owner 110 uses one set of the functions provided by the client program, and the data user 120 uses another set of the functions provided by the client program.

As shown in FIG. 1, the data server 100, the data owner 110, and the data user 120 may be interconnected by a communication network 130, for example the Internet and World Wide Web. This is not a necessary condition of the invention, however, as the interconnection may be over some other communication network, for example a wireless network provided by a cellular telephone or CDPD system, or a local area network, or by direct attachment, and so forth.

A purpose of the configuration shown in FIG. 1 is to allow the data owner 110 to register with the data server 100 and provide information to the data server 100, for example through a web page, and to permit selective transfer of the information to the data user 120. It is not necessary for information that is transferred to be downloaded to the data user 120, only that the data user 120 have access to the information. For example, the data server 100 of an electronic business card system may transfer a business card to the data user 120 by downloading the business card, or may enable or permit the data user 120 to view the business card temporarily, for example through a web page.

As shown in FIG. 1, the data server 100 and the data owner 110 may include sequence number generators 140 and 150, respectively. The sequence number generators 140, 150 may be algorithmic wherein the same sequence number is generated in the same iteration of a common algorithm by the two sequence generators 140, 150, or the sequence number generators 140, 150 may include preestablished lists of sequence numbers held at each sequence number generator 140, 150, or the sequence numbers may be generated en masse or one-by-one by the data owner sequence number generator 150 and sent to the data server sequence number generator 140.

A purpose of the sequence numbers is to enable the data owner 110 to append a unique element that is used only once (subject to wrap, modulo a given field size) to a message that the data owner 110 encrypts and sends to the data server 100 in such a way that the data server 100 may determine an expected counterpart to the unique element. The expected counterpart to a sequence number is called here an expected sequence number. It is not necessary, however, that the sequence numbers be numerical. Although the sequence numbers may be numerical, they may be other kinds of data elements as well, for example elements composed of letters of the alphabet, which are called here sequence numbers for descriptive convenience.

Sequence numbers may be kept separately for each data user (e.g., the first message from a first data user has sequence number 1, the first message from a second data user has sequence number 1, and a second message from the first data user has sequence number 2, and so forth), or may be kept in common across all of the data users (e.g., the first message from a first data user has sequence number 1, the first message from a second data user has sequence number 2, and a second message from the first data user has sequence number 3, and so forth). Use of the sequence numbers is described in detail further below.

As shown in FIG. 1, the data server 100 includes an access list 160. When the data owner 110 grants the data server 100 permission to transfer the information to the data user 120, subject to authentication of any request purporting to come from the data user 120, such permission is recorded in the access list 160 and may persist in the access list 160 for future reference until specifically revoked or removed. Permissions may be revoked and removed from the access list 160 using the same general method (described below with reference to FIGS. 3-4) to grant and record permission, or by automatic expiration in response to a time-out, and so forth.

Figure 2:
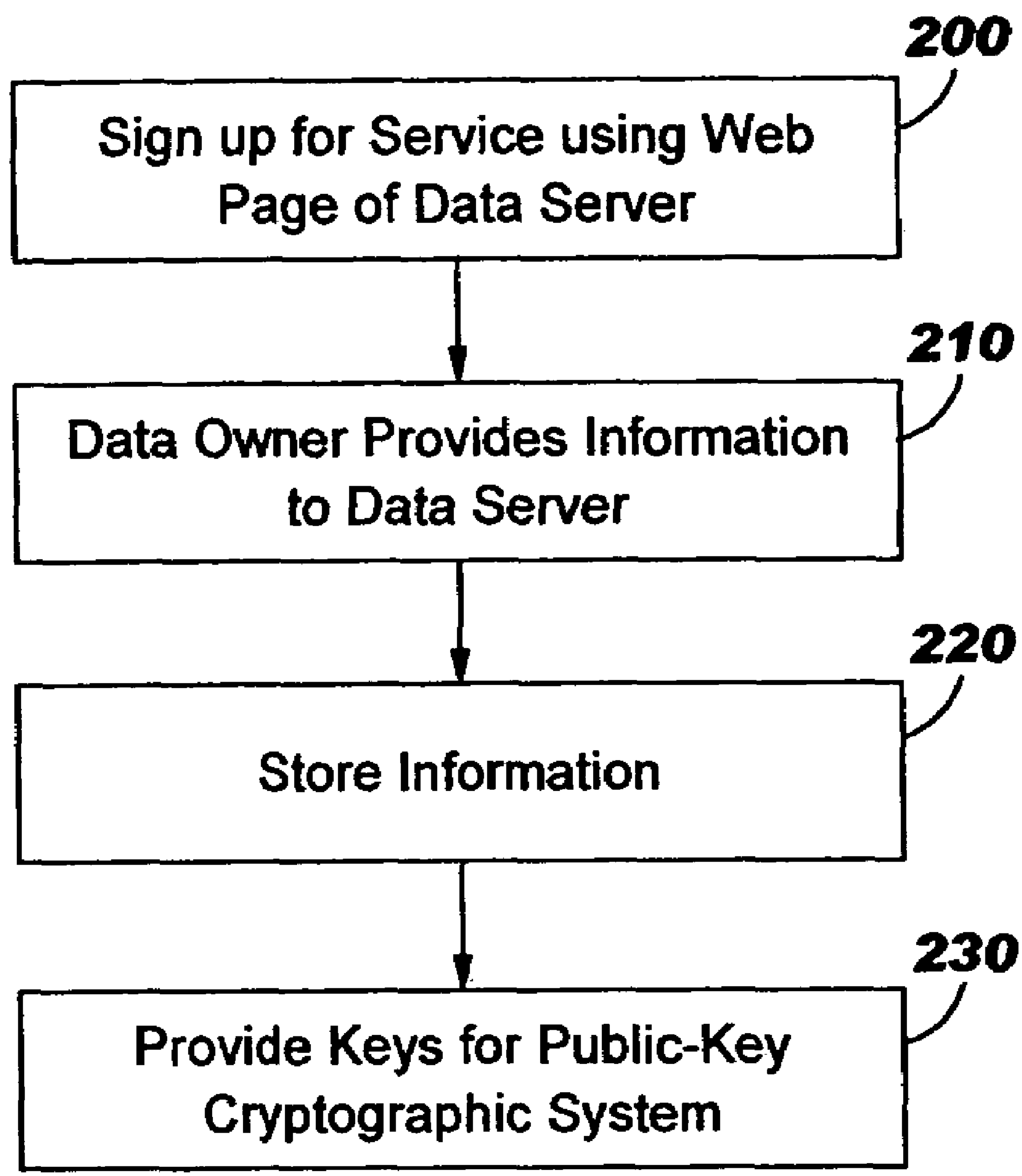
FIG. 2 is a flowchart that shows aspects of a process for registering the data owner and the data user of FIG. 1 with the data server.

FIG. 2 is a flowchart that shows aspects of a process for registering the data owner 110 with the data server 100. The data owner 110 may sign up for service through a web page provided by, or on behalf of, the data server 100 (step 200). For example, the data owner 110 may sign up for an electronic business card service through the Internet 130. In response to prompting, or subject to other technique, the data owner 110 provides information to the data server 100 (step 210). The information is to be shared selectively with data users such as the data user 120, and may be, for example, business card data. The data server 100 stores the information (step 220). The data owner 110 is then provided a data owner public key and a data owner private key, where the two keys constitute a key pair of a public-key cryptography system, and the data server is provided the data owner public key (step 230). Public-key cryptography is described at length by Schneier in *Applied Cryptography* (Second edition, John Wiley & Sons, New York, 1996).

In the process of FIG. 2, the keys may be provided by the data server 100 itself over the Internet 130, or may be provided by another element, for example a specialized device or service interconnected with the data owner 110 and the data server 100 by the Internet 130. To provide an added measure of security, the data owner private key may be delivered to the data owner 110 by postal service mail or by an overnight delivery courier rather than over the Internet 130.

The data user 120 follows the same initial registration process shown in FIG. 2, with the optional exception of steps 210 and 220. In step 230, a data user private key is provided to the data user 120, and a data user public key is provided to the data user 120 and the data server 100, where the data user private key and the data user public key constitute a key pair for the public-key cryptography system.

Figure 3:
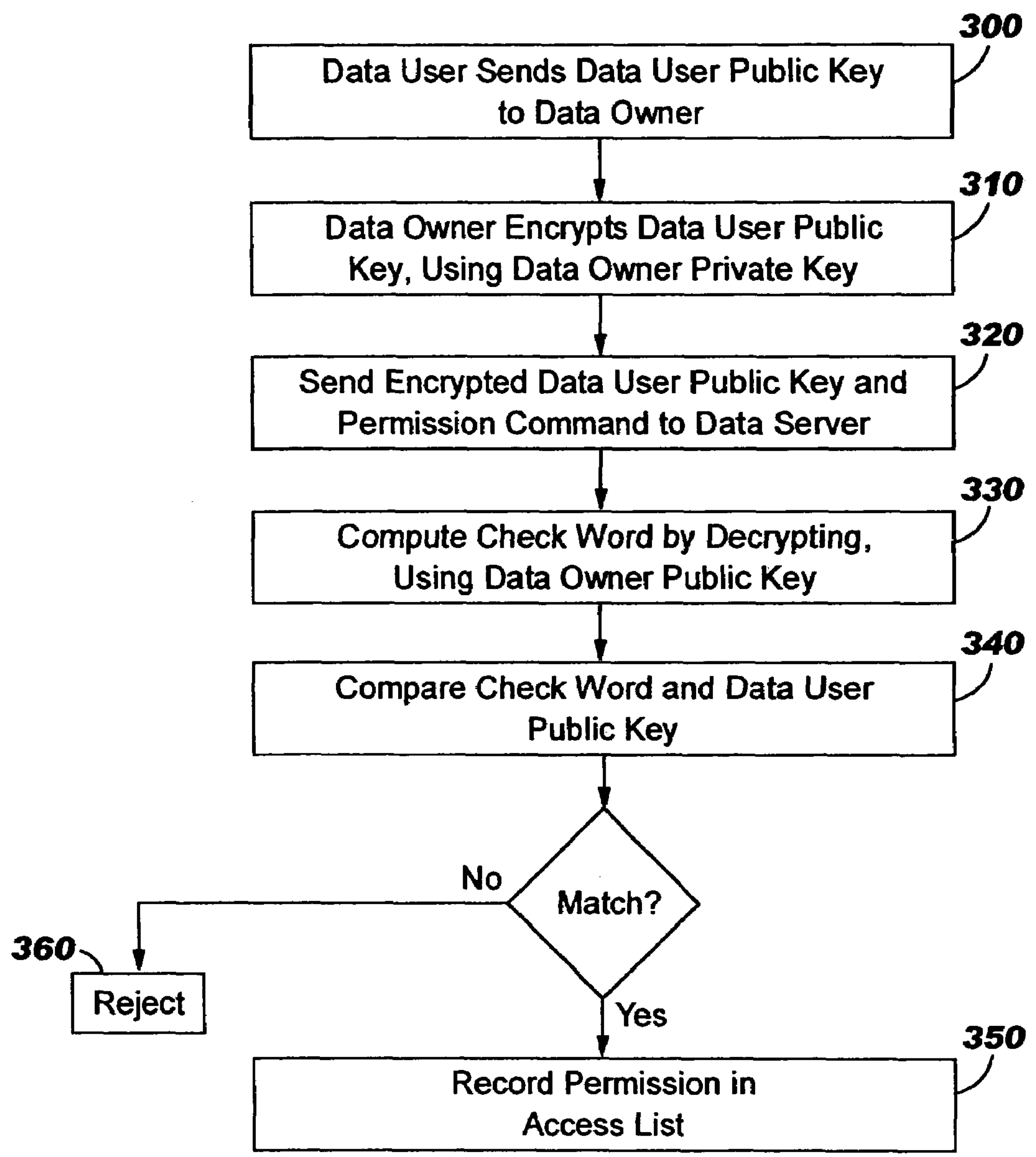
FIG. 3 is a flowchart that shows a way of granting the data server permission to transfer, to the data user, information owned by the data owner.
Figure 4:
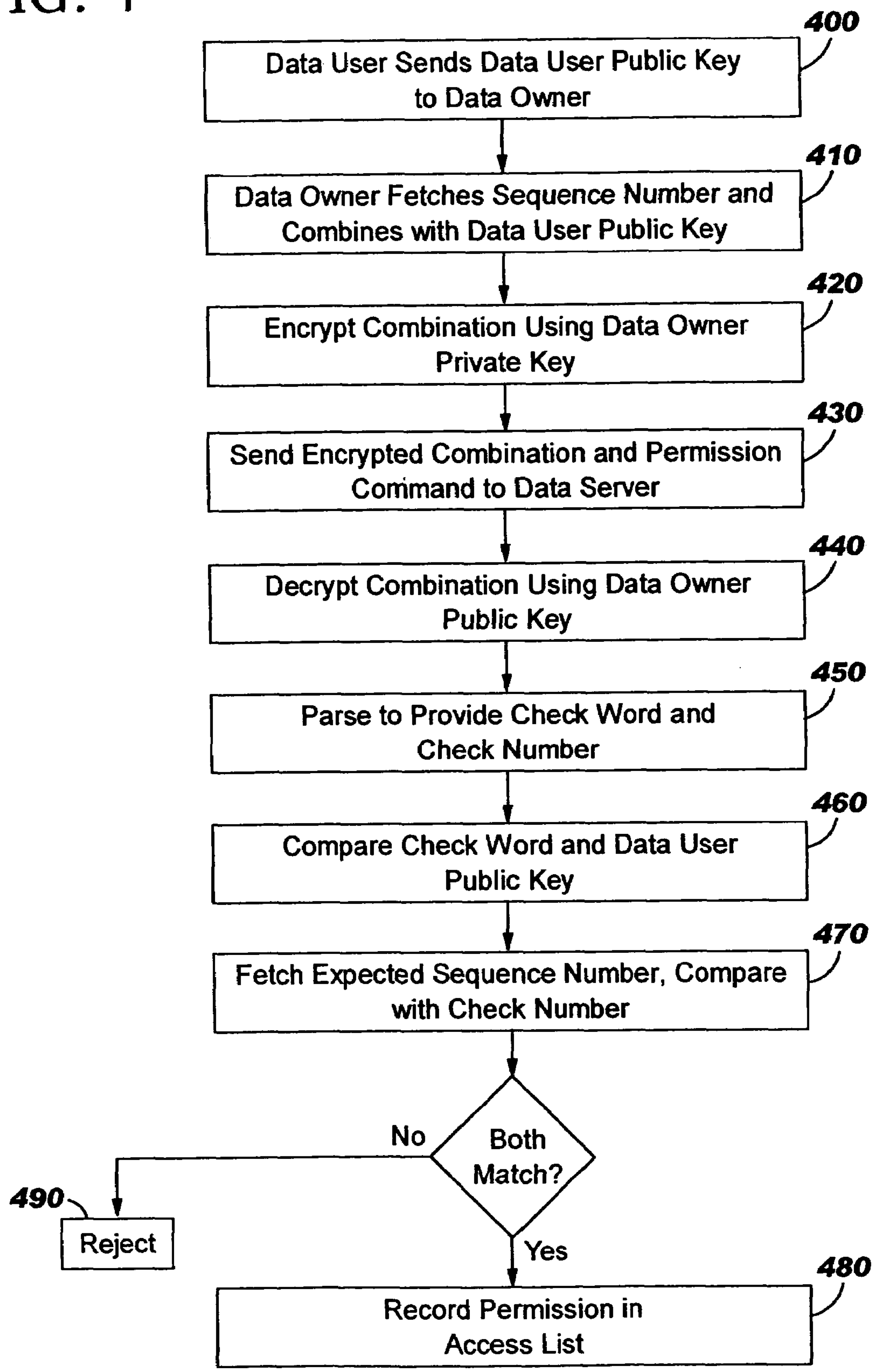
FIG. 4 is a flowchart that shows another way of granting the data server permission to transfer, to the data user, information owned by the data owner.

FIGS. 3 and 4 show processes according to the present invention for granting the data server 100 permission to transfer, to the data user 120, information owned by the data owner 110. As shown in FIG. 3, the data user 120 sends the data user public key to the data owner 110 (step 300). The data owner 110 encrypts the data user public key using the data owner private key, to provide an encrypted data user public key (310). The data owner 110 sends to the data server 100 the encrypted data user public key, along with a permission command that gives the data server 100 permission to transfer the information to the data user 120 (step 320).

Responsive to receiving a message that includes a purported encrypted data user public key and a permission command, the data server 100 computes a check word by decrypting the purported encrypted data user public key, using the data owner public key (step 330). The check word and the data user public key are compared (step 340). If the comparison indicates a match, the data server 100 records in the access list 160 permission to transfer the information to the data user 120 (step 350). Otherwise (i.e., the comparison does not indicate a match), the data server 100 rejects the command (step 360).

Although the process described with reference to FIG. 3 provides a very high level of security, in some situations a hacker might be able to intercept the flow of the encrypted data user public key to the data server 100, and re-use the flow to alter or disrupt the data server 100. In an extreme case wherein the data server 100 was given permission to transfer the information to the data user 120, but the permission was subsequently revoked, the flow captured by the hacker could be re-used fraudulently to reinstate permission. This situation is addressed by the process shown in FIG. 4, which employs sequence numbers.

As shown in FIG. 4, the data user 120 sends the data user public key to the data owner 110 (step 400). The data owner 110 fetches a sequence number from the sequence number generator 150, and combines the sequence number with the data user public key (step 410), to provide a combination. Any invertible way of combining may be used; for example, the sequence number may be appended to the data user public key. The combination is then encrypted using the data owner private key (step 420), and sent to the data server 100 along with a permission command that gives the data server 100 permission to transfer the information to the data user 120 (step 430).

Responsive to receiving a message that includes a purported encrypted combination and a permission command, the data server 100 decrypts the purported encrypted combination using the data owner public key (step 440). The result is parsed, to invert the combining operation, to provide a check word that potentially corresponds to the data user public key and a check number that potentially corresponds to the sequence number (step 450).

The check word and the data user public key are compared (step 460). An expected sequence number is fetched from the sequence number generator 140, and the expected sequence number and the check number are compared (step 470). If both comparisons indicates matches, the data server 100 records in the access list 160 permission to transfer the information to the data user 120 (step 480). Otherwise (i.e., at least one of the comparisons does not indicate a match), the data server 100 rejects the permission command (step 490). Due to the presence of the sequence number in the encrypted combination, a hacker cannot re-use an intercepted flow, as the re-used sequence number will not match the expected sequence number when compared (in step 470) by the data server 100.

Figure 5:
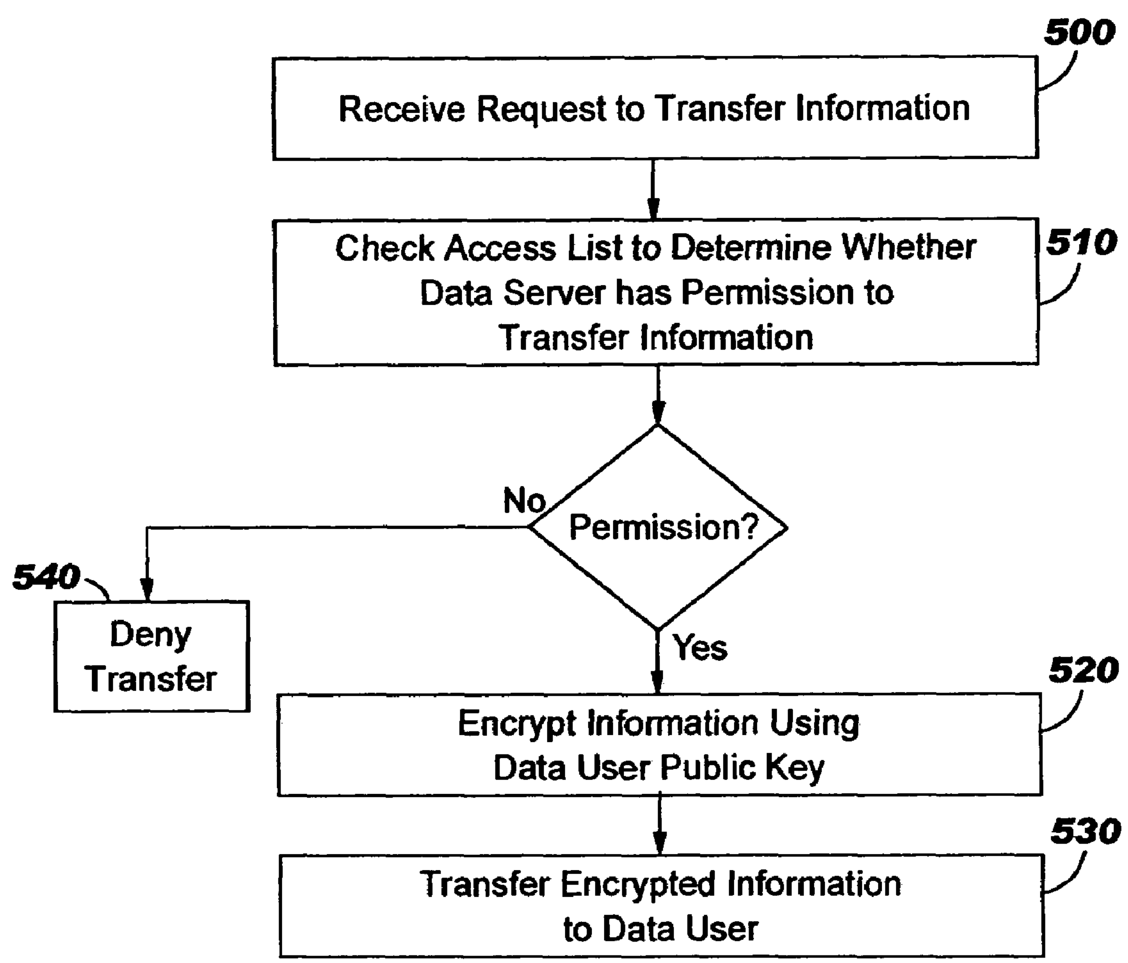
FIG. 5 is a flowchart that shows a way of transferring, to the data user, information owned by the data owner.

FIG. 5 is a flowchart that shows a way of transferring, to the data user 120, information owned by the data owner 110. The process of FIG. 5 relies on encrypting the information to be transferred, so that a hacker who intercepts the transfer cannot reproduce the information. In FIG. 5, the data server 100 receives a request to transfer the information to the data user 120 (step 500). The data server 100 checks the access list 160 to determine whether the data server 100 has permission to transfer the information to the data user 120 (step 510). If the data server 100 has permission, the information is encrypted using the data user public key (step 520) and transferred to the data user 120 (step 530). Otherwise (i.e., the data server 100 does not have permission to transfer), the request is denied (step 540).

Figure 6:
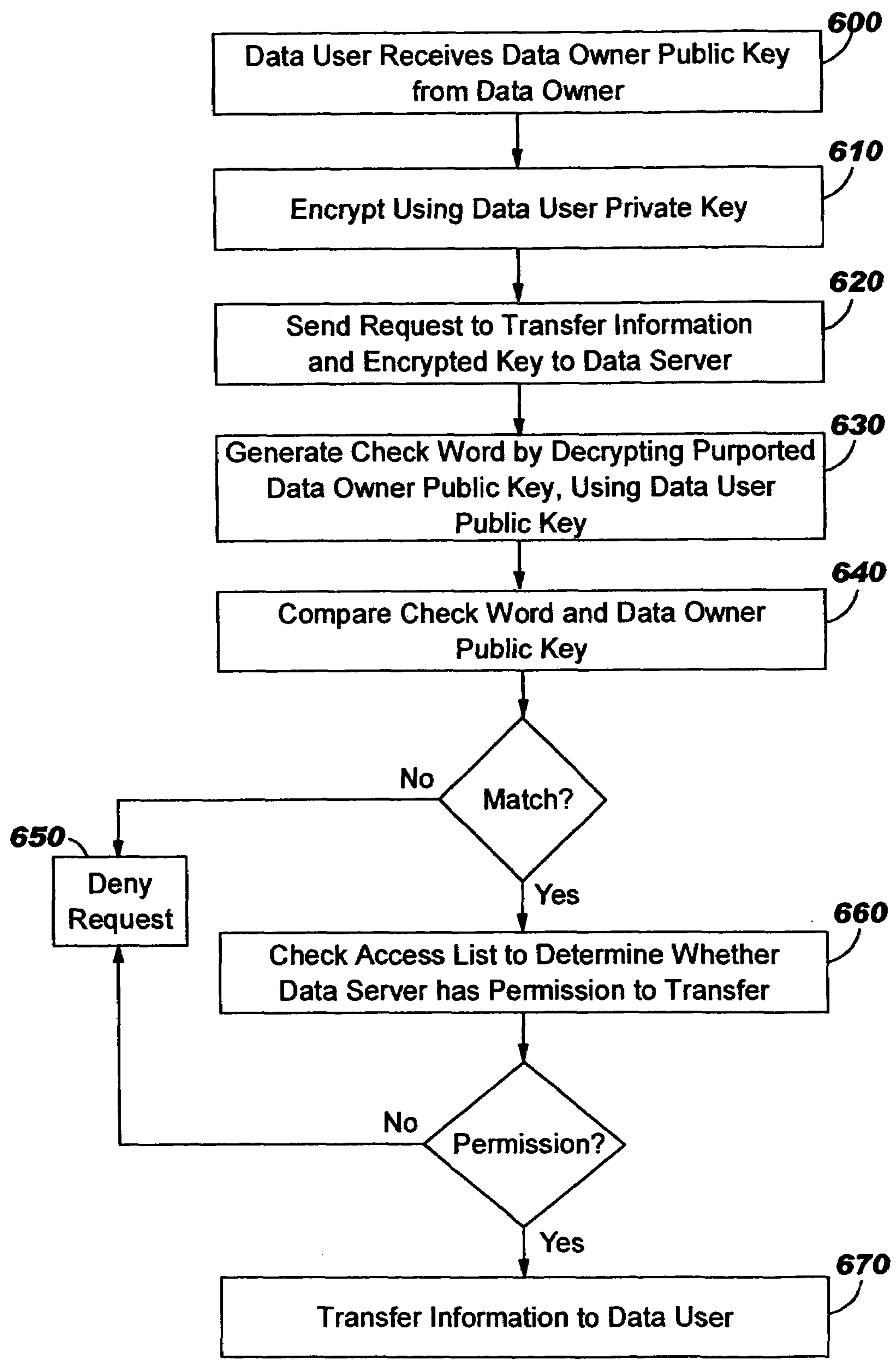
FIG. 6 is a flowchart that shows a way of authenticating the data user, prior to transferring the information to the data user.

FIG. 6 is a flowchart that shows another way of transferring, to the data user 120, information owned by the data owner 110. The process of FIG. 6 relies on authentication of the data user 120 with the presumption that the transfer will not be intercepted, and offers the advantage that the information may be transferred in clear text rather than encrypted.

In FIG. 6, the data user 120 receives the data owner public key from the data owner 110 (step 600). The data user 120 encrypts the data owner public key using the data user private key (step 610), and sends, to the data server 100, the encrypted data owner public key together with a request to transfer the information to the data user 120 (step 620).

Responsive to receiving a purported encrypted data owner public key accompanied by a request to transfer the information, the data server 100 computes a check word by decrypting the purported data owner public key, using the data user public key (step 630). The data server 100 compares the check word and the data owner public key (step 640). If the comparison does not indicate a match, the request is denied (step 650).

Otherwise (i.e., the comparison indicates a match), the data server 100 checks the access list 160 to determine whether the data server 100 has permission to transfer the information to the data user 120 (step 660). If the data server 100 has permission to transfer the information, the data server 100 transfers the information to the data user 120 (step 670). Otherwise (i.e., the data server 100 does not have permission), the request is denied (step 650).

From the foregoing description, those skilled in the art will appreciate that the present invention provides secure access to information held in a shared repository. The foregoing description is illustrative rather than limiting, however, and the invention is limited only by the scope of the claims that follow.

We claim

1. A method for providing secure access to information held in a shared repository, comprising the steps of:

storing, on a data server, information provided by a data owner;

providing, to the data owner, a data owner public key and a data owner private key, the data owner public key and the data owner private key being a first key pair of a public-key cryptography system;

providing the data owner public key to the data server;

providing, to a data user, a data user public key and a data user private key, the data user public key and the data user private key being a second key pair of the public-key cryptography system;

providing the data user public key to the data server;

sending the data user public key from the data user to the data owner;

encrypting the data user public key by the data owner, using the data owner private key, to provide an encrypted data user public key;

sending, by the data owner to the data server, the encrypted data user public key and a command that gives the data server permission to transfer the information to the data user;

decrypting the encrypted data user public key, using the data owner public key, to provide a check word;

comparing the check word and the data user public key;

if the step of comparing the check word and the data user public key indicates that the check word and the data user public key match, recording permission to transfer the information in an access list;

encrypting the data owner public key, by the data user, using the data user private key, to provide an encrypted data owner public key;

sending, from the data user to the data server, the encrypted data owner public key and a request to transfer the information to the data user;

decrypting the encrypted data owner public key using the data user public key, to provide a second check word;

comparing the second check word and the data owner public key;

if the step of comparing the second check word and the data owner public key indicates that the second check word and the data owner public key match, checking the access list to determine whether the data server has permission to transfer the information;

if the data server has permission, transferring the information from the data server to the data user;

receiving, by the data server, a request by the data user to transfer the information to the data user;

responsive to receiving the request, checking the access list to determine whether the data server has permission to transfer the information;

if the data server has permission, encrypting the information using the data user public key to provide encrypted information; and transferring the encrypted information to the data user.

2. The method of claim 1, wherein the information includes an electronic business card.

3. A method for providing secure access to information held in a shared repository, comprising the steps of:

storing, on a data server, information provided by a data owner;

providing, to the data owner, a data owner public key and a data owner private key, the data owner public key and the data owner private key being a first key pair of a public-key cryptography system;

providing the data owner public key to the data server;

providing, to a data user, a data user public key and a data user private key, the data user public key and the data user private key being a second key pair of the public-key cryptography system;

providing the data user public key to the data server;

sending the data user public key from the data user to the data owner;

combining, by the data owner, the data user public key and a sequence number, to provide a combination;

encrypting the combination by the data owner, using the data owner private key, to provide an encrypted combination;

sending, by the data owner to the data server, the encrypted combination and a command that gives the data server permission to transfer the information to the data user;

decrypting the encrypted combination, using the data owner public key, to provide a decrypted combination;

parsing the decrypted combination to provide a check word and a check number;

comparing the check word and the data user public key;

comparing the check number and an expected sequence number;

if the step of comparing the check word and the data user public key indicates that the check word and the data user public key match, and further if the step of comparing the check number and an expected sequence number indicates that the check number and the expected sequence number match, recording permission to transfer the information in an access list;

encrypting the data owner public key, by the data user, using the data user private key, to provide an encrypted data owner public key;

sending, from the data user to the data server, the encrypted data owner public key and a request to transfer the information to the data user;

decrypting the encrypted data owner public key, using the data user public key, to provide a second check word;

comparing the second check word and the data owner public key;

if the step of comparing the second check word and the data owner public key indicates that the second check word and the data owner public key match, checking the access list to determine whether the data server has permission to transfer the information;

if the data server has permission, transferring the information from the data server to the data user;

receiving, by the data server, a request by the data user to transfer the information to the data user;

responsive to receiving the request, checking the access list to determine whether the data server has permission to transfer the information; and, if the data server has permission, encrypting the information using the data user public key to provide encrypted information; and transferring the encrypted information to the data user.

4. The method of claim 3, wherein the information includes an electronic business card.

* * * * *